(12) United States Patent
Patel (10) Patent No.: US 6,327,660 B1
(45) Date of Patent: Dec. 4, 2001

(54) METHOD FOR SECURING COMMUNICATIONS IN A PRE-BOOT ENVIRONMENT

(75) Inventor: Baiju V. Patel, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/156,247

(22) Filed: Sep. 18, 1998

(51) Int. Cl.[7] ..................................................... G06F 1/28
(52) U.S. Cl. .......................... 713/193; 713/156; 713/158; 380/44; 380/277
(58) Field of Search ..................... 380/277, 44; 713/156, 713/158, 161, 168, 169, 171, 193

(56) References Cited

U.S. PATENT DOCUMENTS

| | | | |
|---|---|---|---|
| 4,278,837 | 7/1981 | Best | 178/22.09 |
| 5,022,077 | 6/1991 | Bewlkowski et al. | 380/4 |
| 5,144,659 | 9/1992 | Jones | 380/4 |
| 5,289,540 | 2/1994 | Jones | 380/4 |
| 5,359,659 | 10/1994 | Rosenthal | 380/4 |
| 5,421,006 | 5/1995 | Jablon et al. | 395/575 |
| 5,444,850 | 8/1995 | Chang | 395/200.1 |
| 5,448,045 | * 9/1995 | Clark | 235/382 |
| 5,450,489 | 9/1995 | Ostrover et al. | 380/3 |
| 5,465,299 | 11/1995 | Matsumoto et al. | 380/23 |
| 5,479,509 | 12/1995 | Ugon | 380/23 |
| 5,500,897 | * 3/1996 | Hartman, Jr. | 380/25 |
| 5,666,411 | 9/1997 | McCarty | 380/4 |
| 5,699,428 | 12/1997 | McDonnal et al. | 380/4 |
| 5,835,594 | 11/1998 | Albrecht et al. | 380/23 |

* cited by examiner

Primary Examiner—Thomas R. Peeso
(74) Attorney, Agent, or Firm—Blakely, Sokoloff, Taylor & Zafman LLP (57) ABSTRACT

Briefly, one embodiment of the present invention relates to a method comprising the act of providing a communication link between a first electronic system and a second electronic system. Prior to booting of an operating system of the first electronic system, the communication link is secured to protect the integrity of data transferred over the communication link.

19 Claims, 12 Drawing Sheets

METHOD FOR SECURING COMMUNICATIONS IN A PRE-BOOT ENVIRONMENT

BACKGROUND

1. Field

The present invention relates to the field of data security. More particularly, this invention relates to a system and method for securing a communication channel during a pre-boot operational state.

2. General Background

Computers have become an important product for both commercial and personal use, in part due to their versatility. Over the last few years, computers are being used as a vehicle to transfer information over private networks as well as publicly accessible networks such as, for example, the Internet. In many situations, it may be desirable to "secure" communications between computers.

Currently, after booting the operating system (OS), a computer exists in a "post-boot" operational state. In its post-boot operational state, the computer is able to establish one or more secure communication channels with another computer. A communication channel is considered to be "secure" when (i) the modification of data transmitted through the communication channel can be detected, and (ii) the source of the transmitted data can be authenticated, and/or the confidentiality of the transmitted data is protected. Cryptographic techniques such as digital certificates, digital signatures, and the encryption/decryption of data are used to secure a communication channel.

While these cryptographic techniques can protect the integrity and authenticity of data being communicated in its post-boot operational state, it appears that these have not been successful attempts to secure communications in a "pre-boot" operational state (e.g., before booting of the OS) due to the complexity of the secure communication protocols and the constraints in the flash memory in the pre-boot operational state. Providing a secure communication channel during the pre-boot operational state, when there is limited support from the OS or system resources, will become increasingly important in those situations where data effecting the functionality of the computer (e.g., the OS image, diagnostic software, etc.) is downloaded or when the results of certain computations in the pre-boot operational state are communicated to a management system.

SUMMARY OF THE INVENTION

In brief, one embodiment of the present invention relates to a method comprising the act of providing a communication link between a first electronic system and a second electronic system. Prior to booting of an operating system of the first electronic system, the communication link is secured to protect the integrity of data transferred over the communication link.

BRIEF DESCRIPTION OF THE DRAWINGS

The features and advantages of the present invention will become apparent from the following detailed description of the present invention in which.

DETAILED DESCRIPTION

Certain embodiments of the invention are described to provide a secure communication channel for an electronic system existing in a pre-boot operational state where support from the operating system (OS) is limited and most resources are unavailable. Herein, various examples of system architectures and methods of operation are described. These examples should be broadly construed as illustrative in nature in order to represent the spirit of the invention.

Certain terminology is used to describe various embodiments of the system architecture. An "electronic system" includes hardware to process Internet Protocol Security (IPSEC) software for establishing and maintaining secure communications with another electronic system. Examples of hardware include, but is not limited or restricted to a computer (e.g., a laptop, desktop, hand-held, server, mainframe, etc.), imaging equipment (e.g., printer, facsimile machine, etc.), a set-top box, network routing equipment and the like. "Information" includes one or more bits of data, and/or address, and/or control signal or any combination thereof. A "packet" includes a sequence of information organized for transmission through a communication channel. A "word" is N-bits of information, where "N" is a positive whole number being a factor of two (e.g., 32, 64, etc.). A "communication channel" includes one or more pathways for information to be routed. These pathways may be established through any type of medium such as electrical wire, fiber optics, cable, Plain Old Telephone System (POTS) lines, leased lines or even wireless communications.

With respect to cryptography related terminology, "keying material" includes data used to produce a key. A "key" is an encoding and/or decoding parameter, which is normally a unique sequence of binary data derived from the keying material. A "digital signature" includes digital data encrypted with a private key of its signatory. The digital data may be provided in its entirety or in an encoded form produced by a one-way hash function such as MD5 by Ron Rivest, or any other well-known or existing hash functions. The digital signature is used to protect the integrity of data by avoiding its illicit modification and is used to identify the source of data. In the alternative, a digital signature could be obtained by computing a hash of the data concatenated with a secret key. A "digital certificate" includes a source identifier (e.g., public key, serial number, etc.) encrypted with a private key of a certification authority. Examples of a "certification authority" include a manufacturer, a trade association, a governmental entity, a bank or any other entity in a position of trust by the consumer.

A. System Architecture (Hardware)

Figure 1:
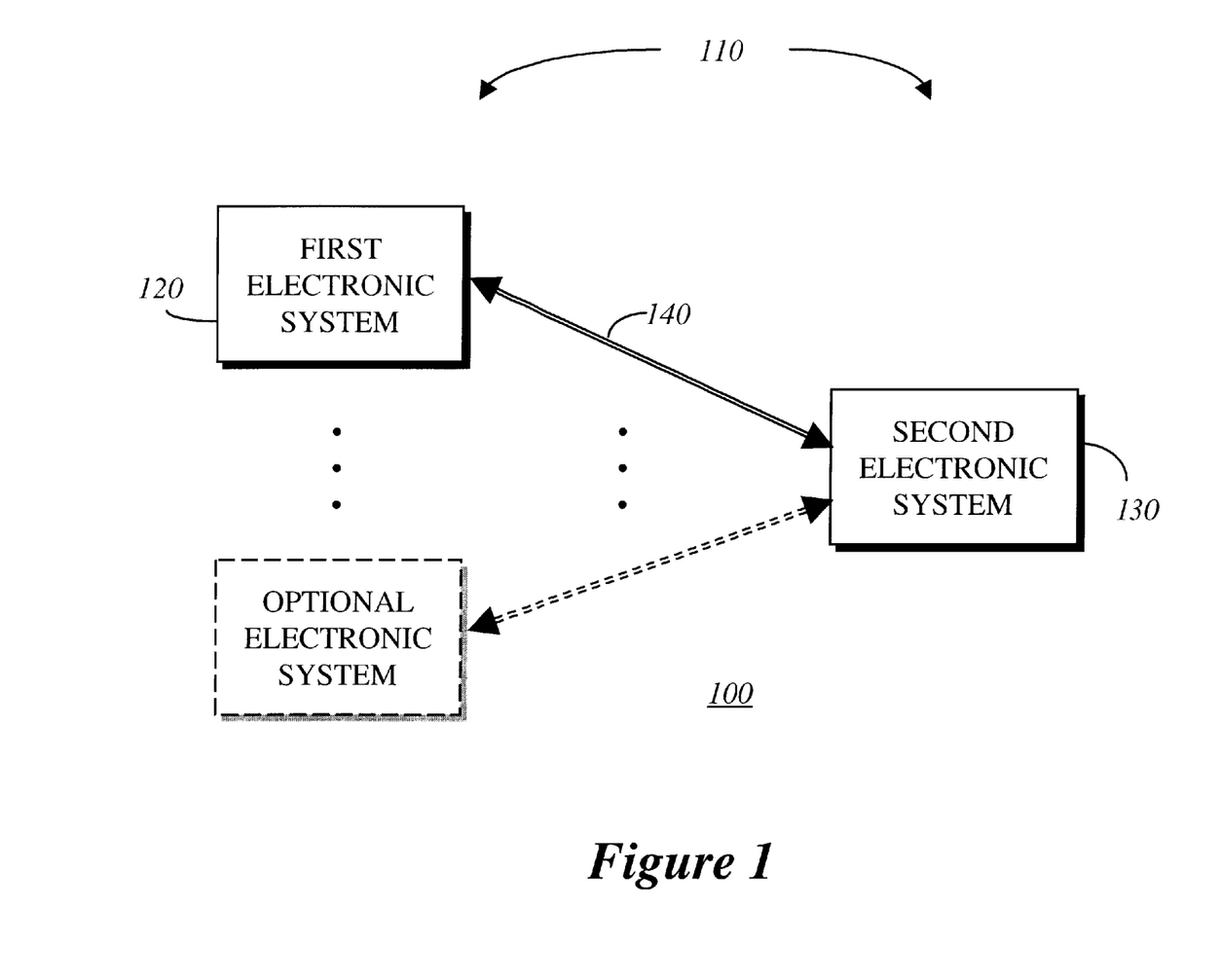
FIG. 1 is a block diagram of an illustrative embodiment of a network including a plurality of electronic systems.

Referring now to FIG. 1, an illustrative embodiment of a network 100 comprising a plurality of electronic systems 110 is shown. These plurality of electronic systems 110 include a first electronic system 120 in communication with a second electronic system 130 over a communication channel 140. For example, second electronic system 130 may be implemented as a server to provide information (e.g., an operating system "OS" image) to one or more electronic systems being managed.

At power-on and in a pre-boot operational state, first electronic system 120 operates, in cooperation with second electronic system 130, to secure the transmission of information over communication channel 140. During this pre-boot operational state, the operating system (OS) of first electronic system 120 is not fully functional and various system resources of that system 120 are not yet initialized. However, the OS of second electronic system 130 is operational. In a "post-boot operational state," however, the OS of both first electronic system 120 and second electronic system 130 are fully operational.

Figure 2:
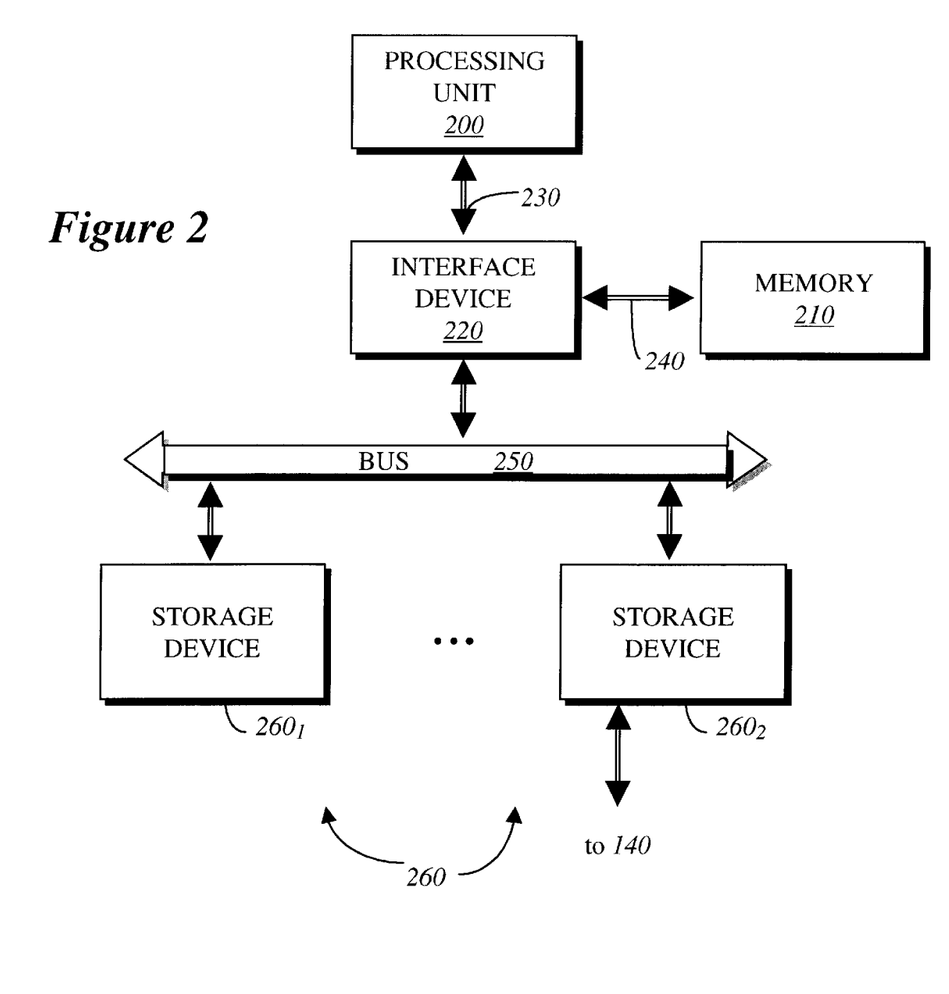
FIG. 2 is a block diagram of an illustrative embodiment of a first electronic system.

Referring now to FIG. 2, a diagram of an illustrative embodiment of first electronic system 120 is shown. First electronic system 120 is adapted with hardware and software to secure communications over communication channel 140 of FIG. 1 in a pre-boot operational state. In this embodiment, first electronic system 120 comprises a processing unit 200 and a memory 210, which are coupled together by an interface device 220. In one embodiment, interface device 220 includes a chipset coupled to (i) processing unit 200 via a host bus 230, (ii) memory 210 via a memory bus 240, and (iii) a bus 250.

As shown in FIG. 2, bus 250 provides a pathway between processing unit 200 and/or memory 210 and one or more system resources 260. In this embodiment, bus 250 comprises a multiplexed bus (e.g., a well-known Peripheral Component Interconnect "PCI" bus); however, any other type of bus architecture (e.g., Industry Standard Architecture "ISA") or combination of bus architectures is may used. For example, bus 250 is shown as a single bus, but it is contemplated that bus 250 may include multiple buses coupled together through bridge circuitry. For that embodiment, any of the system resources 260 would be coupled to at least one of the multiple buses.

As shown, system resources 260 may include, for example, a storage device $260_1$, a communication device $260_2$ and the like. An illustrative example of storage device $260_1$ includes programmable, non-volatile memory (e.g., flash memory) to contain Basic Input Output System (BIOS) code. Other examples of storage device $260_1$ includes a Network Interface Card "NIC" or a hard drive partitioned in accordance with particular database structure to provide persistent storage. An example of communication device $260_2$ includes a network card or a modem card to establish a logical connection to communication channel 140 of FIG. 1.

B. Pre-Boot System Architecture (Software)

Figure 3:
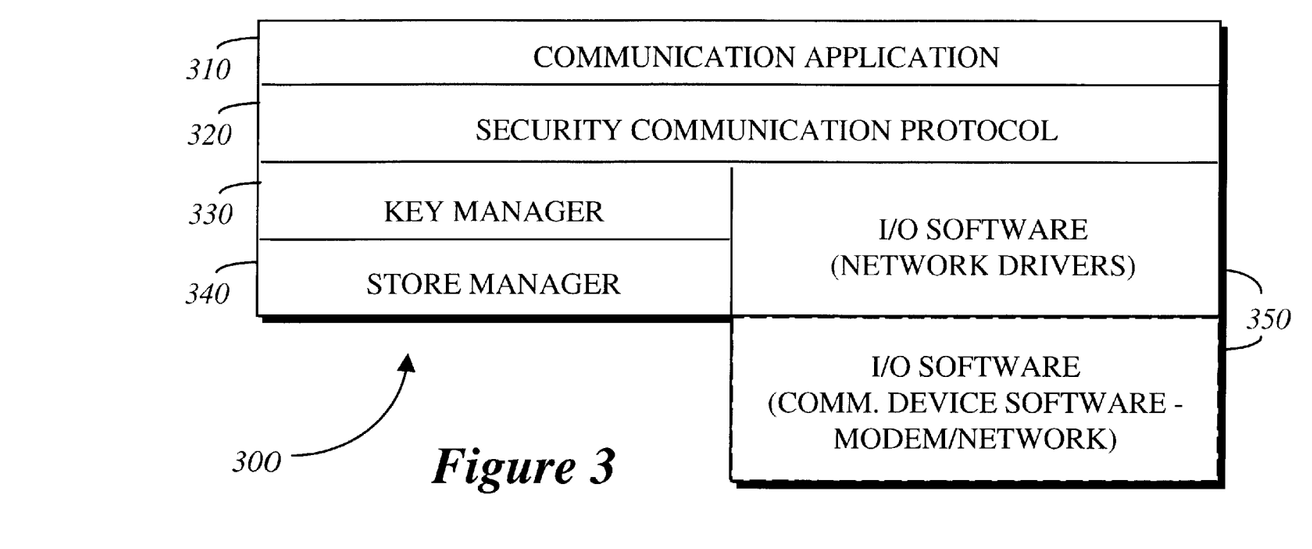
FIG. 3 is a block diagram of an illustrative embodiment of layered software, inclusive of a security communication protocol, to secure a communication channel in a pre-boot operational state.

Referring now to FIG. 3, a diagram of an illustrative embodiment of layered software, pre-loaded into storage device $260_1$ of first electronic system 120, is shown. This software 300 is used to secure communications with another system during a pre-boot operational state. As shown, software 300 comprises a communication application 310, a security communication protocol 320, a key manager 330, a storage manager 340, and Input/Output (I/O) software 350 to control communications for first electronic system 120. In particular, communication application 310 includes one or more programs used to control the transmission and reception of packets. I/O software 350 is executed to establish and maintain communications with second electronic system 130 of FIG. 1. I/O software 350 includes, for example, network drivers, modem software, networking software and the like.

Referring still to FIG. 3, security communication protocol 320 functions as an interface between communication application 310 and both key manager 330 (described below) and storage manager 340 being used to control the access of information within storage device $260_1$ of FIG. 2. One embodiment of security communication protocol 320 includes an Internet Protocol Security Authentication Header (IPSEC AH) defined in a publication by Stephen Kent et al. entitled "*Security Architecture for the Internet Protocol,*" published by the Internet Engineering Task Force (IETF) IPSEC Working Group (1998) (website: ftp:// ftp.ietf.org/internet-drafts/draft-ietf-ipsec-auth-header-07.txt). IPSEC AH is a protocol designed to protect the integrity of information transmitted between electronic systems. Alternatively, a second security communication protocol, referred to as "Internet Protocol Security Encapsulating Security Payload (IPSEC ESP)," is designed to protect both the integrity and confidentiality of information transmitted as a plurality of packets between electronic systems as described below IPSEC ESP is defined by the publication cited above (website ftp:// ftp.ietf.org/internet-drafts/draft-ietf-ipsec-esp-v2-06.txt).

Figure 4:
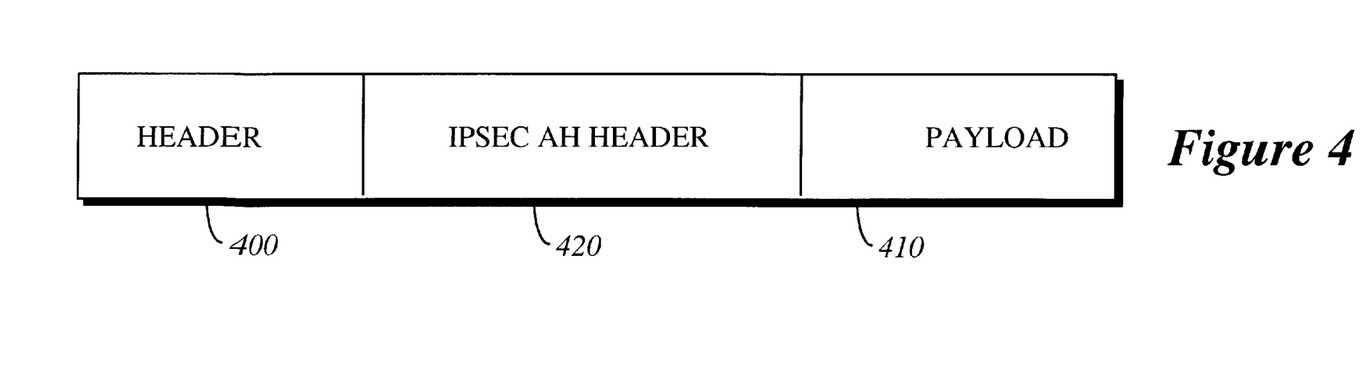
FIG. 4 is a block diagram of an illustrative embodiment of the data structure of a packet transmitted between the first and second electronic system of FIG. 1.

Referring now to FIG. 4, a diagram of an illustrative embodiment of a packet in accordance with IPSEC AH protocol is shown. Normally, this IPSEC AH packet comprises a header 400 and a payload 410. Header 400 provides an Internet Protocol (IP) address of a targeted recipient while payload 410 contains information intended for the targeted recipient. When undergoing the IPSEC AH protocol, an additional IPSEC AH header 420 is placed between header 400 and a payload 410 for example. IPSEC AH header 420 is used to protect the integrity of the contents of payload 410. In one embodiment, header 400 provides an Internet Protocol (IP) address of a targeted recipient.

Figure 5:
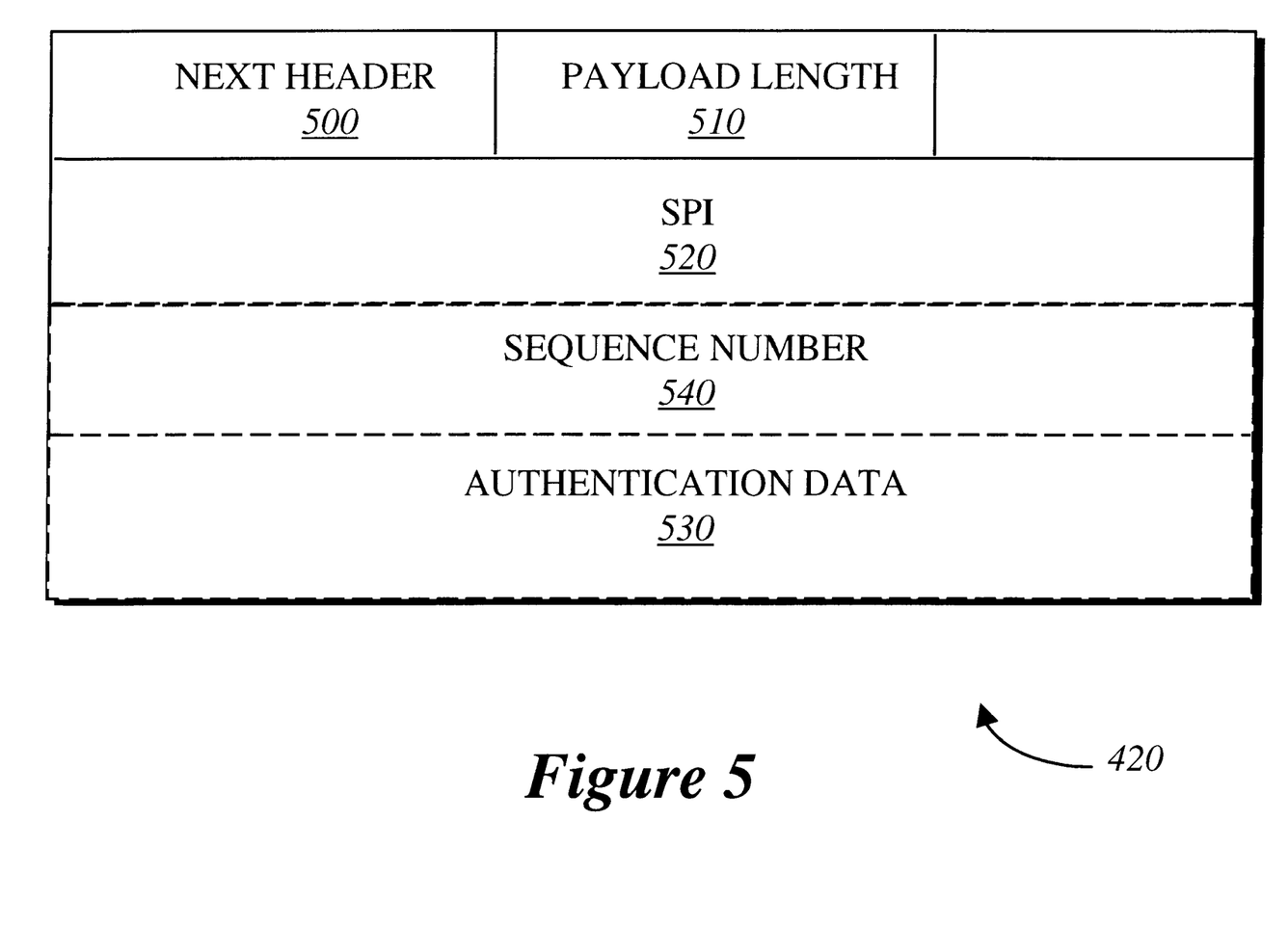
FIG. 5 is a block diagram of an illustrative embodiment of the data structure of the IPSEC AH header of the security communication protocol of FIG. 3.

Referring to FIG. 5, a diagram of an illustrative embodiment of a data structure of IPSEC AH header 420 is shown. IPSEC AH header 420 comprises a plurality of fields such as, for example, a next header field 500, a payload length field 510, a security parameter index (SPI) field 520, and an authentication data field 530. Of course, IPSEC AH header 420 may further comprise one or more optional fields such as, for example, a sequence number field 540. The sequence number field 540 contains a monotonically increasing counter value to signal when a security association needs to be re-negotiated as described below to prevent replay attacks.

Referring still to FIG. 5, next header field 500 includes a plurality of bits which collectively identify the next subsequent flow of packets following payload 410 of FIG. 4. For example, next header field 500 may be loaded with a predetermined binary number (e.g., 110 or 10001) to represent various types of packets such as Transmission Control Protocol (TCP). Payload length field 510 includes a plurality of bits whose selected value is used to calculate the byte length of IPSEC AH header 420.

As further described, SPI field 520 includes an arbitrary N-bit value that uniquely identifies a security association (described below) contained in storage device $260_1$ of FIG. 2. Typically, SPI is 32-bits in length (N=32). Authentication data field 530 includes an integrity check value (ICV) and padding to ensure that the size of IPSEC AH header 420 is an integral multiple of words.

Figure 6:
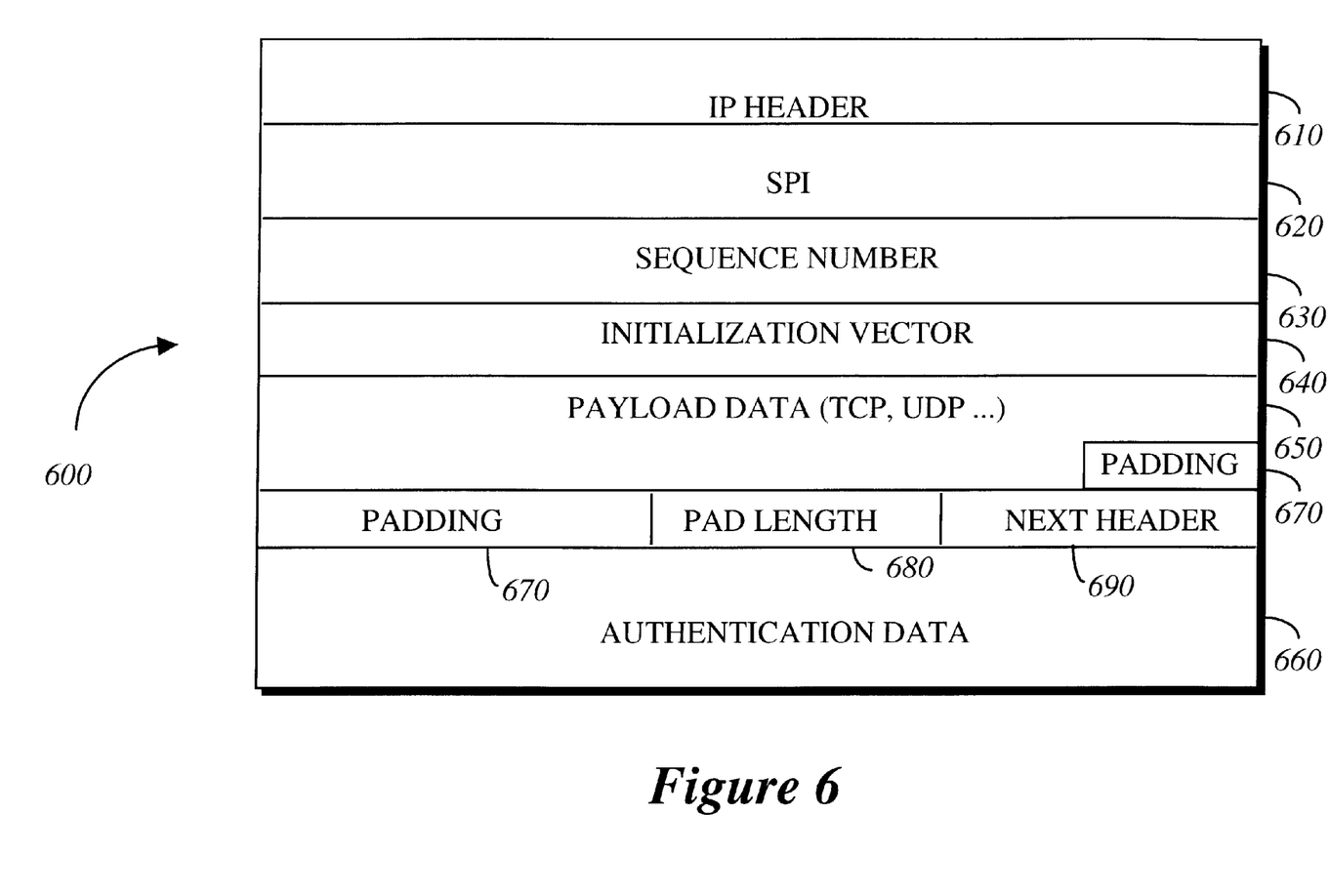
FIG. 6 is a block diagram of an illustrative embodiment of the data structure of an alternative security communication protocol.

Referring now to FIG. 6, when the IPSEC ESP protocol is used as the security communication protocol 320, an IPSEC ESP packet 600 is produced in lieu of IPSEC AH packet of FIGS. 4 and 5. IPSEC ESP packet 600 protects both the integrity and confidentiality of information during transmission. In particular, the data structure of IPSEC ESP packet 600 comprises an IP header 610, a security parameter index (SPI) field 620, a sequence number 630, an initialization vector (IV) field 640, a payload field 650 and an authentication data field 660. The integrity of the packet containing IPSEC ESP packet 600 is protected through analysis of SPI field 620 and sequence number 630. The confidentiality of the packet is protected by encrypting the contents of payload field 650 and providing a variable amount of padding 670 as needed. Contained within IV field 640, the initialization vector is well-known random number and used by various encryption algorithms such as Data Encryption Standard (DES). Payload field 650 contains packets associated with upper layer protocols (e.g., Transmission Control Protocol "TCP"). Padding 670 includes a pad length field 680 and a next header field 690 to indicate the amount of padding provided and the type of packet(s) following the payload, respectively.

Referring back to FIG. 3, key manager 330 is a software module configured to map certain keying material or keys contained in storage device $260_1$ of FIG. 2 and retrieved by storage manager 340. The keying material is used to derive keys for hash functions (e.g., Message Digest "MD" type functions like MD5-HMAC or Secure Hash Algorithm "SHA" type functions like SHA-1-HMAC). In accordance with a simple mapping scheme, the keying material includes one or more keys. Thus, key manager 330 simply transfers some or all of these pre-stored keys to security communication protocol 320.

To establish secured communications over a channel, security communication protocol 320 requires access to a security association during the pre-boot operating state. In one embodiment, a "security association" is a simplex (unidirectional) logical connection created so that information traversing through the logical connection undergoes the same security processing. For the IPSEC architecture described herein, the security association is an Internet layer abstraction.

Figure 7:
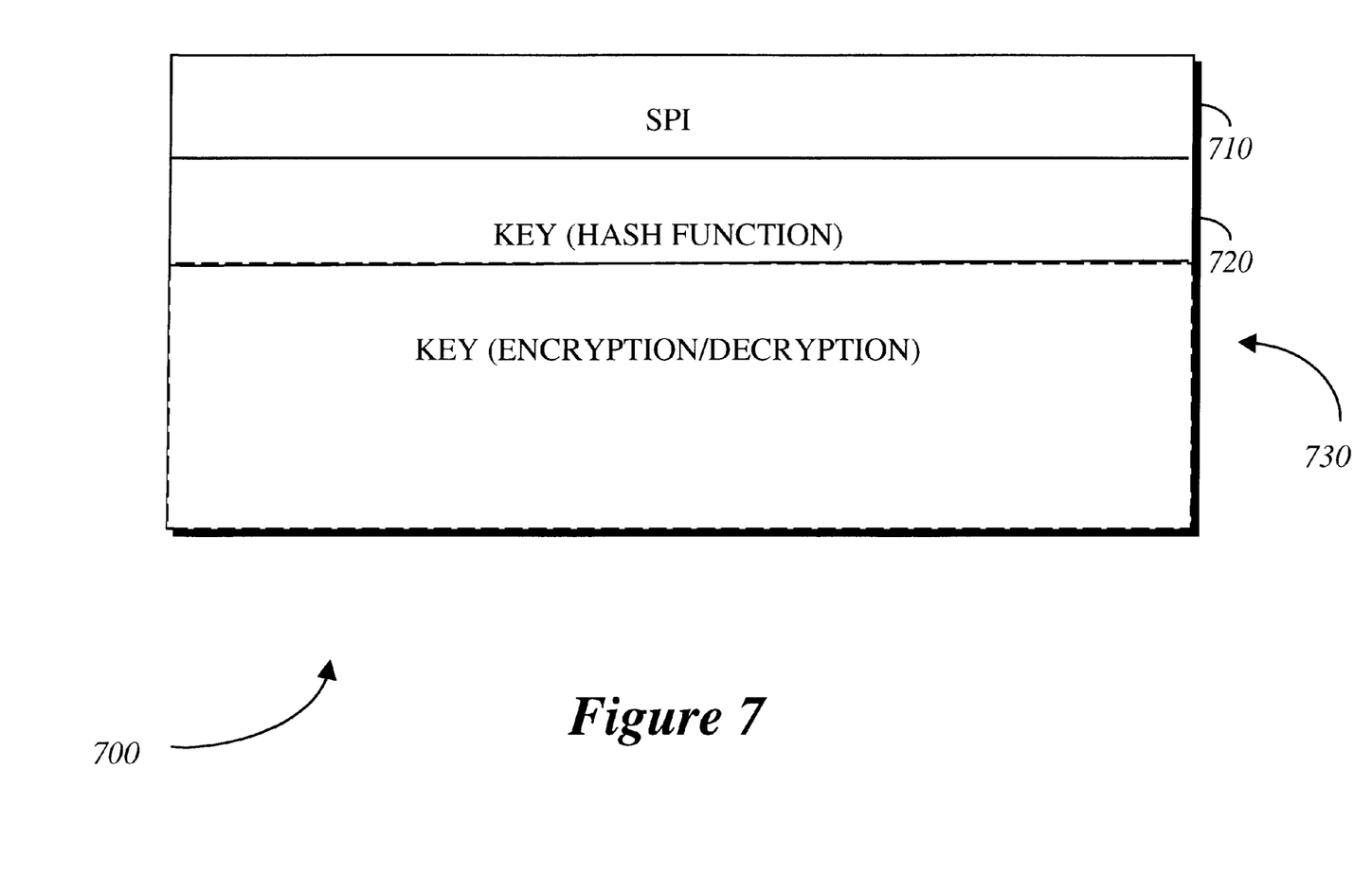
FIG. 7 is a block diagram of an illustrative embodiment of a security association contained within a storage device of the first electronic system of FIG. 2.

As shown in FIG. 7, various parameters of a security association 700 are loaded in storage device $260_1$ of FIG. 2. These parameters include a security parameter index (SPI) 710, a key 720 for the hash function utilized by key manager 330 of FIG. 3, and an optional transmission key 730 which is used for encryption and/or decryption (when IPSEC ESP security protocol is used). SPI 710 is a unique signal representing an identification of security association 700 in the first electronic system 120. For example, SPI may be represented as a multiple bit value (e.g., a 32-bit value, 64-bit value, etc.) to differentiate this electronic system from another. Key 720 is a signal representative of a 128-bit value (for MD5-HMAC) and a 140-bit value (for SHA-1-HMAC). The optional encryption/decryption key 730 is 40-bits for an exportable version, 56-bits or 168-bits for a domestic version. It also include information on algorithms selected for secure communication (e.g., ESP or AH, DES or 3DES)

Security association 700 can be established through several schemes. For example, the first electronic system may be pre-configured with an appropriate security association. In this situation, first electronic system is loaded with an address of the second electronic system, SPI, and keys for encryption and decryption of information, inclusive of digital signatures. In some embodiments, however, multiple security associations are stored in the first electronic system and are used in some predetermined order so that different keys are used at different times.

Another scheme is for the first electronic system to generate the security association based on user input. Herein, the user would enter a pass-phrase (e.g., a string of alphanumeric characters) which is subsequently loaded into a one way hash function. The result of this hash function (referred to as a "hash value") is a bit string forming SPI 710 and keys 720 and 730. If the hash value does not result in sufficient number of bits, the pass-phrase can be concatenated with selected information to generate different values of security association 700. As an example, x0101010H can be concatenated with the pass-phrase and hashed to generate SPI 710 while x0202020H can be concatenated with the pass-phrase to generate encryption key(s) 730 and so on. Likewise, if the hash value is longer than the required bit length, it can be truncated to a smaller value. Similarly, if the truncated values result in a known weak key, or a reserved value for SPI, subsequent bits can be used to generate the appropriate values. For example, after transaction, when the first "M" bits result in a weak key, bits 1 to M are used instead of bits 0 to M−1. This shifting operation can be repeated until a good value for SPI and encryption key(s) are determined.

Yet another scheme involves the first electronic system negotiating security association 700 during a pre-boot operational state. In this scheme, an Internet Key Exchange (IKE) protocol is implemented in the pre-boot operating environment as one of the communication applications. Therefore, prior to starting normal communications, the first and second electronic systems would engage in key negotiations based on the IKE protocol to determine which keys are required for securing data packets. Since the IKE protocol secures its own packets and therefore, security under IPSEC AH or ESP protocols is not required.

A final scheme involves the first electronic system negotiating a security association during a post-boot operational state and stores the security association in storage device $260_1$ of FIG. 2 for later use during a pre-boot operational state. In particular, first electronic system 120 may implement key management in a post-boot space and load the security association in a particular location of storage device $260_1$ so that it is available in the pre-boot space. Hence, once first electronic system 120 is operational, it enters into key negotiations with second electronic system 130 in accordance with the IKE protocol and stores resultant security association in storage device $260_1$. For any subsequent boot procedure, if first electronic system 120 needs to communicate securely with second electronic system 130, security association 700 is already available.

The above mentioned schemes may directly store security association 700 in the flash memory, or store keying material in the flash memory used to subsequently produce the security association. Due to the limitations on the number of writes to flash memory, a more complex mapping scheme, whereby, the keying material is data used by key manager 330 to produce keys may be deployed. To reduce the number of writes to storage device $260_1$ of FIG. 2, the hash function may be performed on both the keying material and predictable periodically changing data (e.g., a date). For example, to generate keys, the key manager can take the keying material stored in flash memory and concatenate it with a known value such as date, and compute hash over it to generate SPI and keys.

Figure 8:
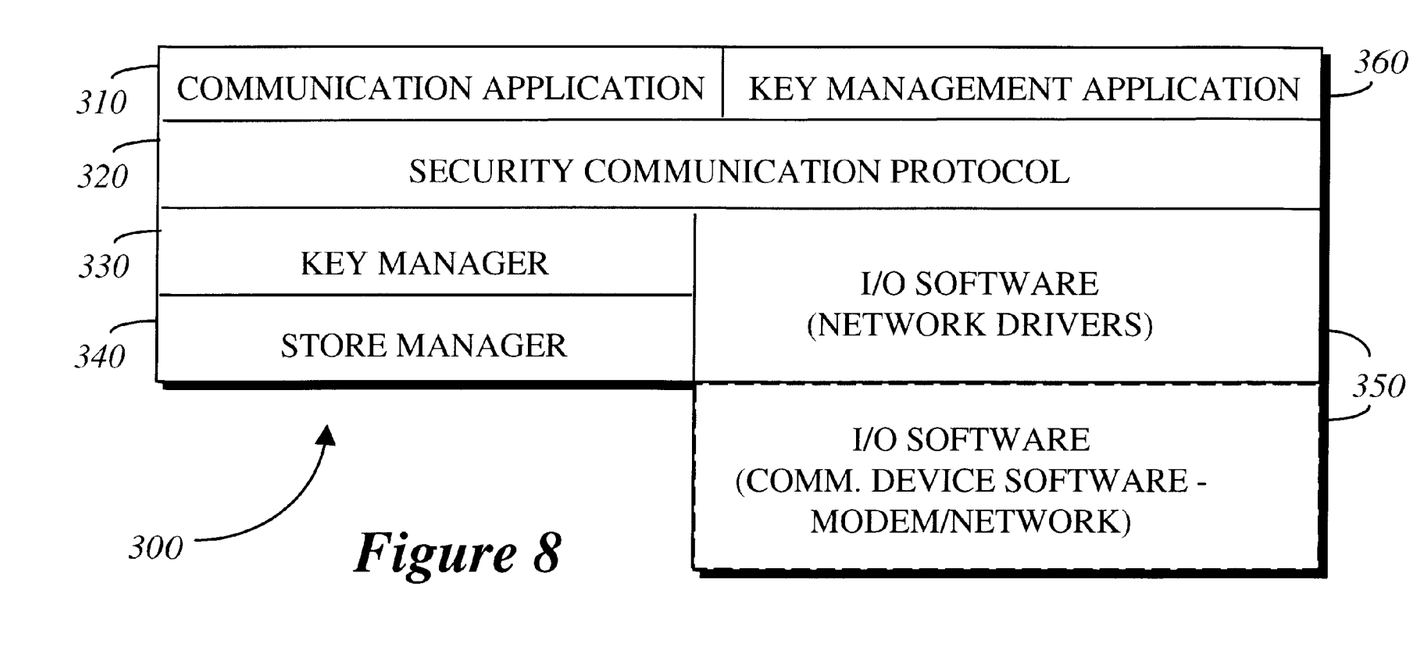
FIG. 8 is a block diagram of an illustrative embodiment of layered software where key management protocol functionality is handled in a post-boot operational state.

The contents of the data structure associated with security communication protocol 320 of FIG. 2 are either pre-loaded or negotiated. In the later situation, negotiations are handled by a key management protocol such as, for example, Internet Key Exchange (IKE). Since the negotiation of security association 700 and other information tends to be complex and not always suitable for implementation in a pre-boot environment, especially where the size of storage device $260_1$ of FIG. 2 is constrained, the key management protocol typically is handled in the post-boot environment as described below. Of course, the key management protocol may be handled in the pre-boot environment, provided size constraints of storage device $260_1$ are relaxed. This is accomplished by executing software 360 having key management protocol (e.g., IKE) functionality before execution of secure communication protocol of FIG. 3 as shown in FIG. 8.

C. Post-Boot System Architecture (Software)

Figure 9:
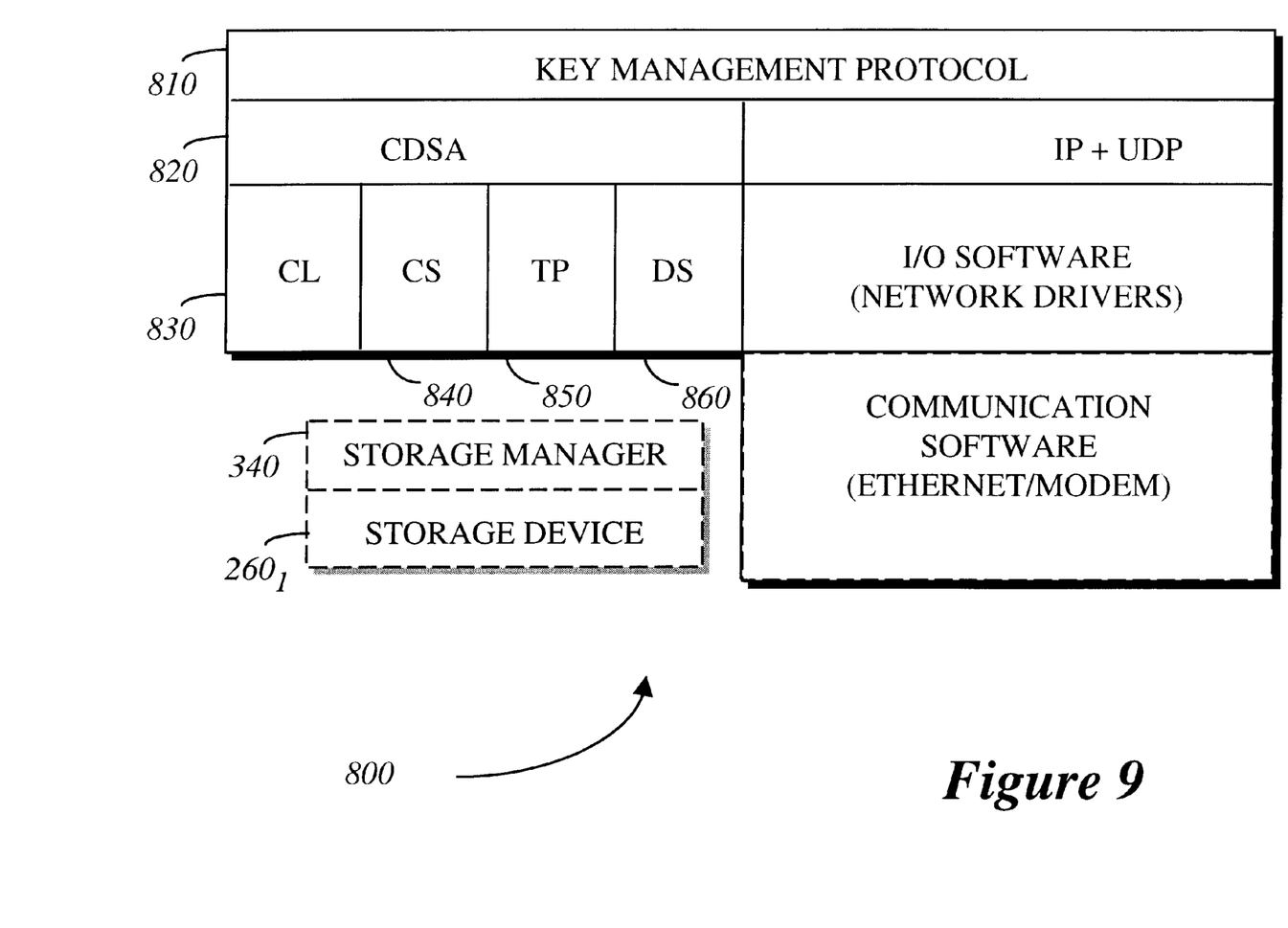
FIG. 9 is a block diagram of an illustrative embodiment of layered software modules, where key management protocol is layered on top of the secure communication protocol and executed before the secure communication protocol.

Referring now to FIG. 9, an embodiment of layered software 800, capable of being used in the post-boot operational state, is shown. For example, a key management protocol 810 is responsible for negotiating the security association and/or keys with a corresponding electronic system in order to ensure that the security association is available for future pre-boot operations. In one embodiment, the key management protocol includes Internet Key Exchange (IKE) as defined by a publication by Harkins et al. entitled *"The Internet Exchange Key* (IKE)," published in 1998 by the Internet Engineering Task Force (IETF) (website ftp://ftp.ietf.org/internet-drafts/draft-ietf-ipsec-isakmp-oakley-08.txt). IETF is a group dedicated to establishing a communication standard.

For example, IKE is a well-known protocol for system authentication, negotiation of security parameters (e.g., type of security communication protocol, crypto-functions, etc.), and determine (agree upon) keys to be used for computing digital signatures and data encryption. The IKE protocol generates keys using Diffie-Hellman exchange and protects IKE-based communications through keys generated using Diffie-Hellman communications. In particular, the IKE protocol relies on digital signatures for authentication of the identifies of the electronic systems in communication and for assurance that these systems are the sole holders of the keys. The outcome of Diffie-Hellman exchanges is also used as keying material for generating keys for IPSEC AH and IPSEC ESP.

To provide greater security, key management protocol 810 is implemented over Common Data Security Architecture (CDSA) 820 which defines an infrastructure for a complete set of security services. CDSA 820 is an extensible architecture that provides mechanisms to manage add-in security modules such as a Certificate Library log (CL) 830, a Cryptographic Services (CS) 840, a Trust Policy Services (TP) 850 and a Data-Store Library Services (DS) 860 as described in a publication entitled "CDSA Release 2.0 Specifications" (website: http://developer.intel.com/ial/security/specs_2_0.htm).

In general, the CS module 820 provides software performing cryptographic operations such as, for example, encryption, decryption, digital signaturing, key pair generation, random number generation and key exchange operations. The TP module 850 implements policies controlling the operations of the software. The CL module 830 provides format-specific manipulations of memory-resident digital certificates and certificate revocation lists. The DS module 860 provides persistent storage for certificates and certificate revocation lists. Collectively, these software modules initiate function calls to storage device $260_1$, sometimes via storage manager 340, to gain access to information therein. In one embodiment of this invention, the DS module 860 provides mechanisms to update (non-volatile) storage device $260_1$ so that when IPSEC needs keys, the keys (or keying material) negotiated during the post-boot operational state is available in storage device $260_1$ during the pre-boot operational state.

D. System Architecture (Loading of Keying Material)

In the event that information (e.g., keying material, security association, etc.) to secure communication channel(s) is not pre-loaded by an original equipment manufacturer into storage device $260_1$ of FIG. 2, a number of embodiments may be used to load information into the first electronic system in order to establish a secure communication channel during the pre-boot operational state.

For example, information may be loaded into the first electronic system through an input device (e.g., a keyboard). Prior to that, the user would negotiate a pass-phrase with an agent associated with the second electronic system. Such negotiations may occur "out-of-band" such as through (i) a telephone call, (ii) keying material printed on an invoice or supplied by a diskette and the like. This agent may be the user, an employee of a particular department of a company (e.g., security department, technical services department, etc.), or even an independent third party (e.g., bank, governmental entity, service provider, etc.). The pass-phrase is used as keying material to generate SPI and one or more keys. The software ensures that the SPI generated from the pass-phrase is unique to that electronic system.

Another example is that the information may be downloaded into the first electronic system via a trusted environment. An example of a "trusted environment" includes a private Intranet for example. To receive the information (e.g., a security association), the first electronic system establishes a connection to the private Intranet to download the security association. Subsequently, in accordance with the IKE protocol, the security association may be updated as needed. Another example of trusted environment is a configuration lab established by an information technology (IT) department where each system is pre-configured with a security association, and only the authorized users have access to this lab and this lab is protected from electronic forms of attack through firewalls or by ensuring that there is no electronic communication allowed between the lab systems and other computers.

E. Establishing A Secure Communication Channel

Figure 10:
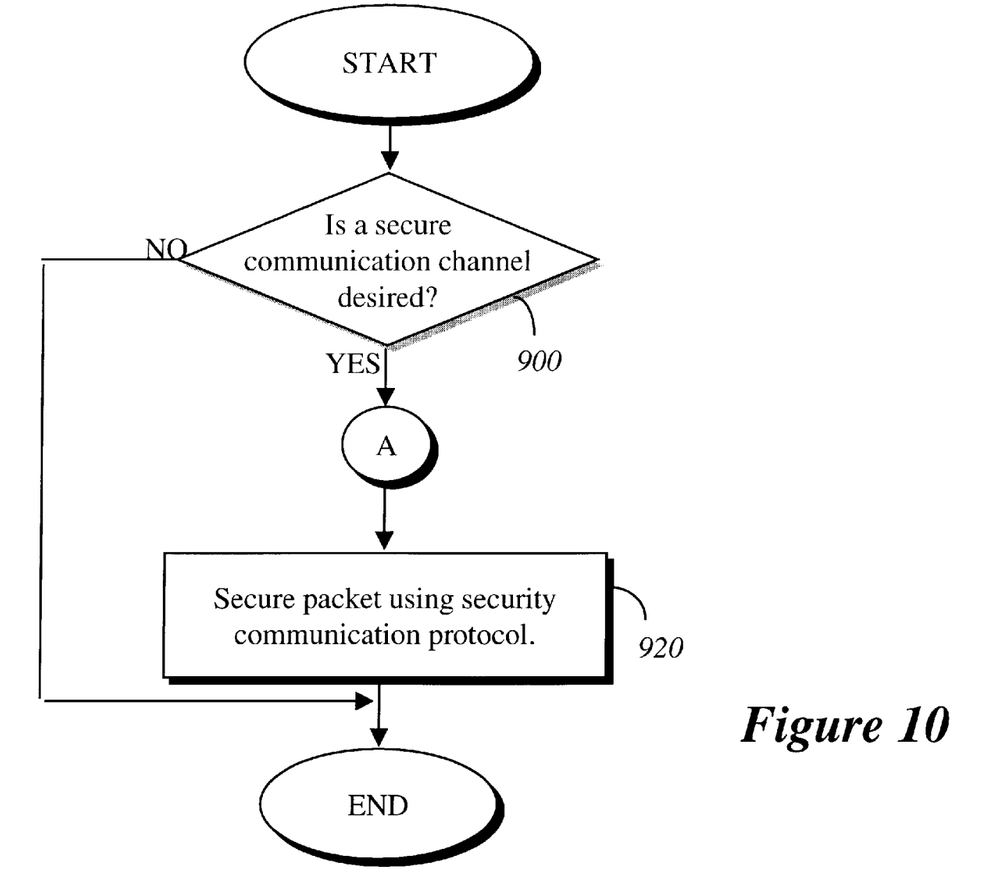
FIG. 10 is an illustrative embodiment of the process performed by the first electronic system of FIG. 2 in establishing a secure communication channel with another electronic system.
Figure 11:
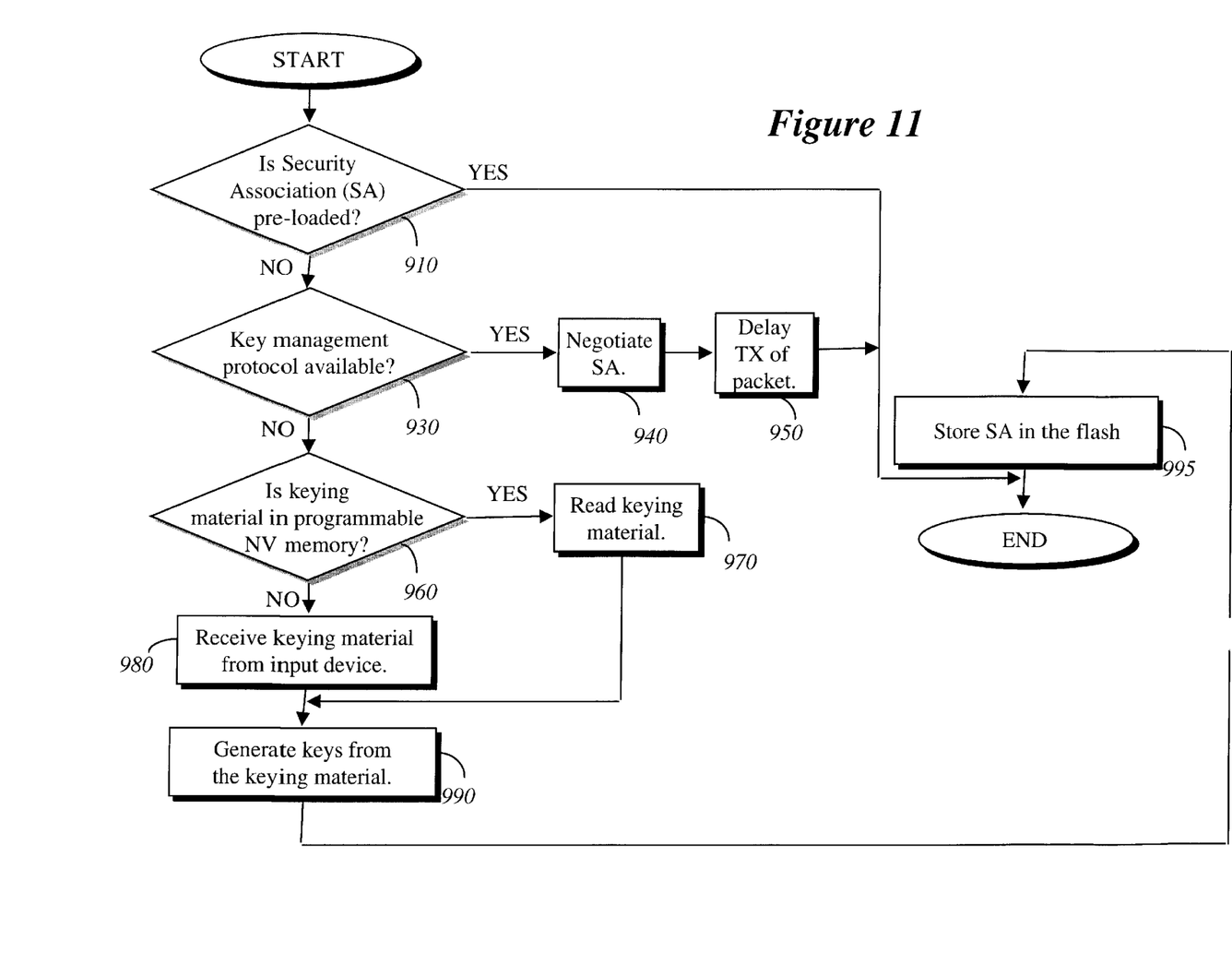
FIG. 11 is an illustrative embodiment of the process in determining the security association in accordance with an act performed in establishing a secure communication channel.

Referring now to FIGS. 10–11, illustrative flowcharts of the acts for establishing a secure communication channel with the first electronic system are shown. Initially, a determination is made as to whether a secure communication channel is desired (block 900). In this embodiment, certain types of traffic may not require secure communications. For example, IKE traffic is protected by IKE protocol itself, and therefore, does not require security through a IPSEC-based protocol. Also, certain classes of applications (e.g., Dynamic Host Configuration Protocol "DHCP") may not be suitable or require secure communications. Another example includes implementation of an electronic system pre-configured to require secure communications, when the system is logically connected to certain untrusted networks. Thus, the first electronic system may require that, when in communication over a publicly accessible network (e.g., Internet), the computer should securely communicate with the second electronic system. The information on when secure channel is required may be preconfigured on the system or that part of the configuration information may be provided by the user at boot time.

Upon establishing that a secure channel is required, a determination is made whether the security association is pre-loaded in the first electronic system (block 910). This determination may occur by reading particular contents of BIOS loaded in the first electronic system. In the event that the security association is pre-loaded in the first electronic system, the packet is secure upon applying a security communication protocol (e.g., IPSEC AH or IPSEC ESP) thereto (block 920).

In the event that the security association is not pre-loaded, a determination is made as to whether the key management protocol is available during the pre-boot operational state (block 930). If available, the security association is negotiated, but transmission of the packet(s) is (are) delayed for re-transmission when the security association is available (blocks 940 and 950). If the key management protocol is not available, the security association is generated from either (i) keying material loaded in a storage device $260_1$ (FIG. 2) of the first electronic system or (ii) keying material received from an input device (blocks 960, 970, 980 and 990). In particular, a key of the security association is generated by performing a hash operation on selected data using the keying material. This keying material is used to produce SPI which is a hash value produced by performing a hash operation on the selected data using the key.

Figure 12:
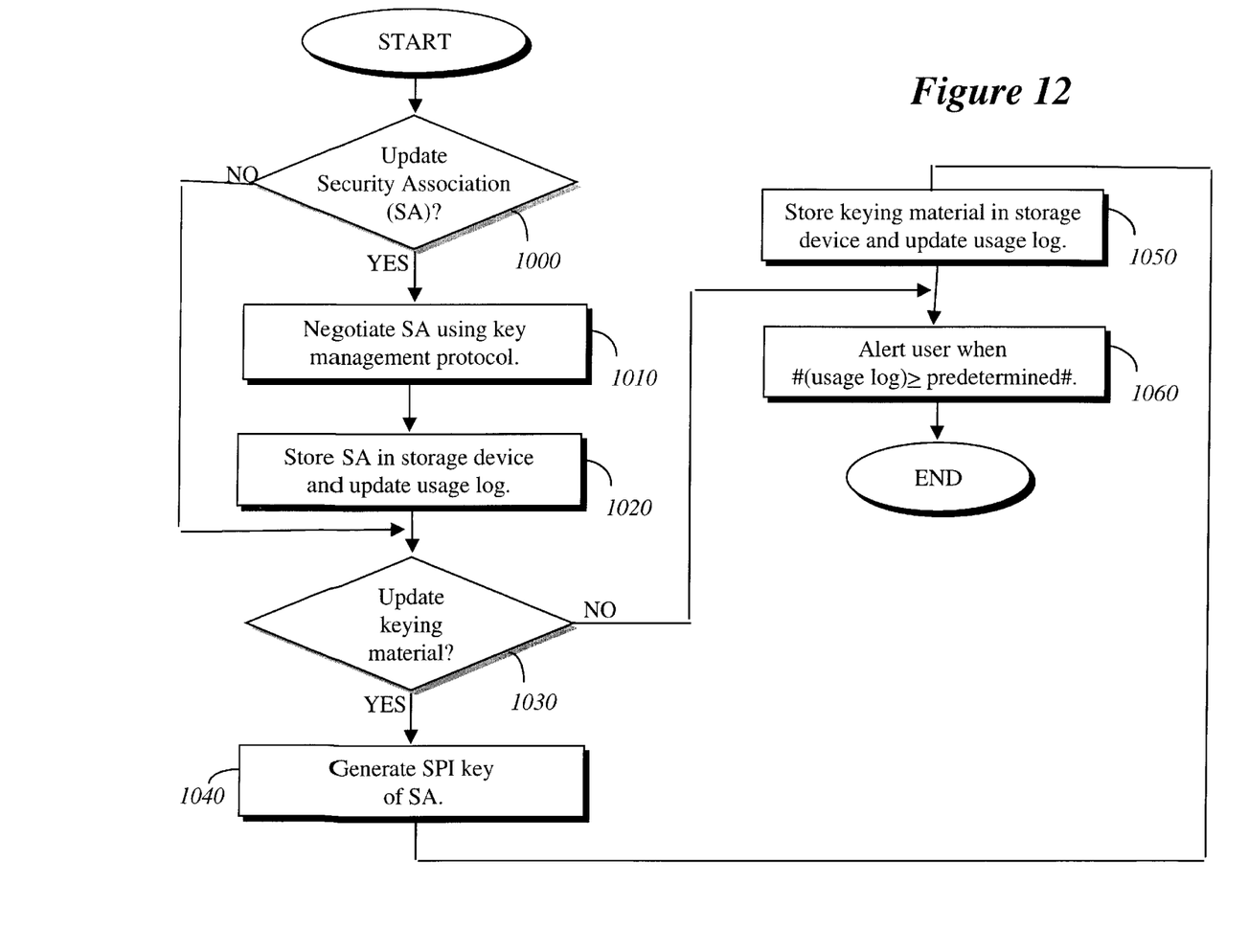
FIG. 12 is an illustrative embodiment of the process performed in updating a security association (or keying material) of the first electronic system of FIG. 2.

Referring now to FIG. 12, in certain situations, the security association of the first electronic system should be updated (block 1000). For example, the security association may have to be updated (re-negotiated using IKE) in case of a system crash, periodic reboot, or based on certain time out periods. If the security association needs to be updated, in block 1010, key management protocol is used to negotiate an updated security association. Then, the updated security association is loaded into the programmable storage device and the usage log is updated (block 1020). The same operations occur for updating the keying material (blocks 1030, 1040 and 1050). In this embodiment, the "usage log" includes a monotonic counter to indicate the number of times that information is written into the programmable storage device. As a result, when the number of writes exceeds a predetermined number, the user may be alerted that the programmable storage device may need replacement to ensure reliability (block 1060).

Figure 13:
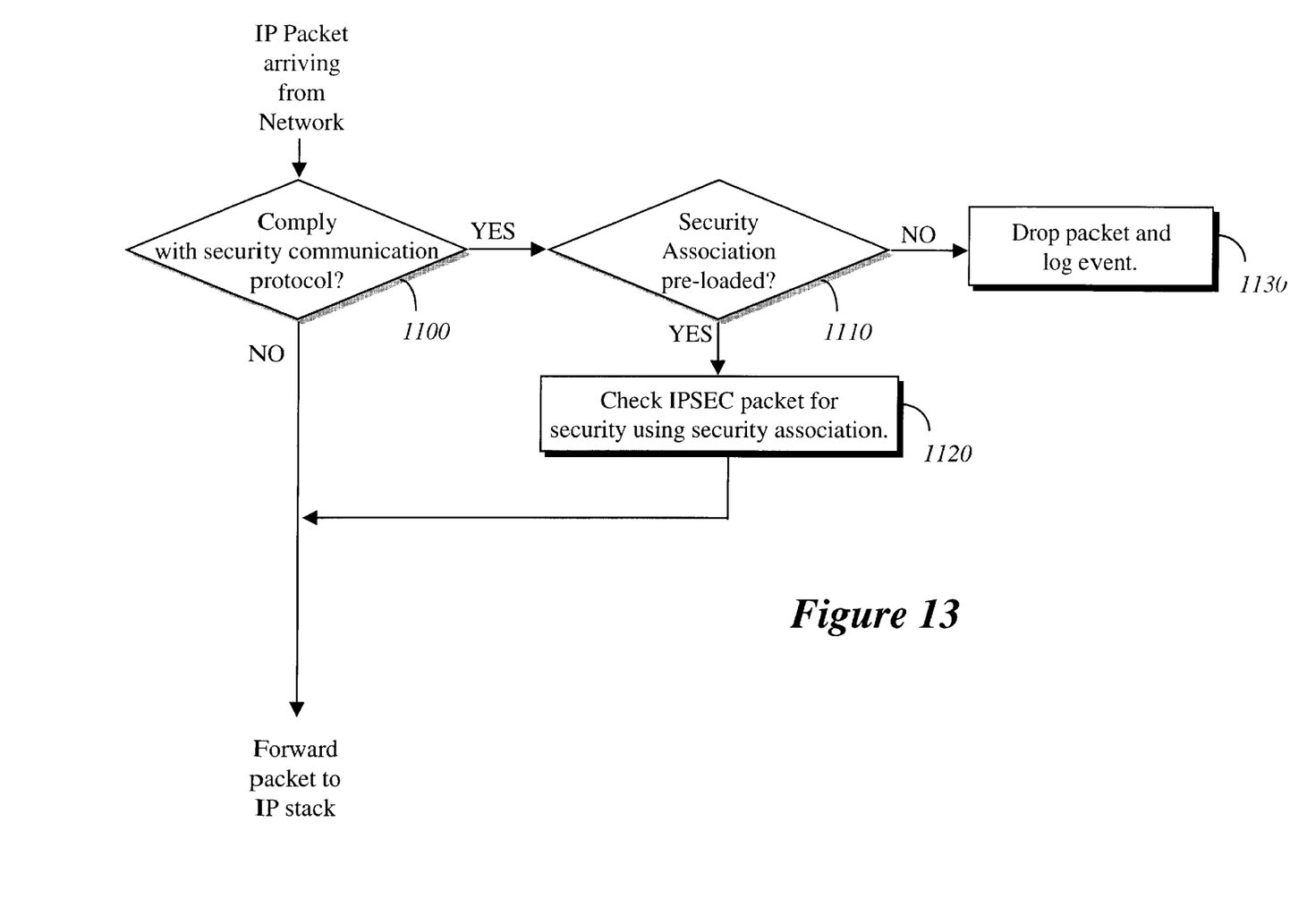
FIG. 13 is an illustrative embodiment of the process performed by the first electronic system in receiving a packet.

Referring to FIG. 13, an illustrative flowchart of the acts performed by the first electronic system in receiving a packet is shown. First, a determination is made whether the packet needs to comply with secure communication protocols used therein (block 1100). If so, a determination is made whether the security association is pre-loaded in the first electronic system (block 1110). If the security association is pre-loaded, it is used to determine whether the packet complies with the implemented security communication protocol (block 1120). However, if the security association is not pre-loaded, the packet is not accepted and the event is logged into a data store (block 1130).

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A method comprising:
   providing a communication link between a first electronic system and a second electronic system; and
   securing the communication link, during a pre-boot operational state prior to completion of booting of an operating system of the first electronic system, to protect integrity of data transferred over the communication link between the first electronic system and the second electronic system.

2. The method of claim 1, wherein the first electronic system comprises a computer including a processing unit and a non-volatile memory accessible by the processing unit.

3. The method of claim 1, wherein the securing of the communication link includes
   determining whether a security association is pre-loaded into the non-volatile memory of the first electronic system; and
   providing the security association to a selected Internet Protocol Security (IPSEC) module, loaded in the non-volatile memory, the IPSEC module, when executed, secures packets of data transferred over the communication link.

4. The method of claim 3, wherein prior to providing the security association, the method further comprises
   determining whether a key management protocol is loaded in the non-volatile memory when the security associated is absent from the first electronic system; and
   negotiating the security association if the key management protocol is loaded in the non-volatile memory.

5. The method of claim 4, wherein the determining of the security association further includes
   checking whether a keying material is loaded in the non-volatile memory when the key management protocol is absent from the non-volatile memory;
   using the keying material to produce portions of the security association if the keying material is loaded in the non-volatile memory; and
   obtaining the keying material from an input device to produce portions of the security association if the keying material is not loaded in the non-volatile memory.

6. The method of claim 5, wherein the keying material undergoes a hash function to produce a unique security parameter index, the security parameter index being a portion of the security association.

7. A layered machine readable medium having embodied thereon a computer program for processing by an electronic system including non-volatile memory, the computer program comprising:
   a first software layer to establish communications with a remotely located electronic system;
   a second software layer to ensure that the communications with the remotely located electronic system are secure; and
   a third software layer to control access of information within the non-volatile memory.

8. The computer medium of claim 7, wherein the second software layer includes a security communication protocol which, when executed, produces a packet of information in accordance with Internet Protocol Secure Authentication Header (IPSEC) standards.

9. The computer medium of claim 8, wherein the packet of information includes an Internet Protocol (IP) header, a payload, and an authentication header including a security parameter index being a parameter of a security association.

10. The computer medium of claim 8, wherein the packet of information includes an Internet Protocol (IP) header, an initialization vector used by a Data Encryption Standard, a payload, and a security parameter index being a parameter of a security association.

11. The computer medium of claim 10, wherein the packet of information further includes padding.

12. The computer medium of claim 7, wherein the third software layer includes a key manager to control negotiations by the electronic system with the remotely located electronic system to obtain a security association.

13. A network comprising:
   a communication link;
   a first electronic system coupled to the communication link, the first electronic system to secure the communication link in a pre-boot environment in order to protect integrity of data transferred over the communication link, the pre-boot environment includes a state existing prior to completion of booting of an operating system of the first electronic system; and
   a second electronic system coupled to the communication link to transfer data to the first electronic system over the secure communication link.

14. The network of claim 13, wherein the data includes an image of an operating system of the first electronic system.

15. The network of claim 13, wherein the first electronic system includes a computer comprises a processor, a storage device including a non-volatile memory including a communication application and a security communication protocol.

16. The network of claim 15, wherein the security communication protocol, when executed, produces a packet of information in accordance with Internet Protocol Secure Authentication Header (IPSEC AH) standards.

17. The network of claim 16, wherein the packet of information includes an Internet Protocol (IP) header, a payload, and an authentication header including a security parameter index being a parameter of a security association.

18. The network of claim 15, wherein the security communication protocol, when executed, produces a packet of information including an Internet Protocol (IP) header, an initialization vector used by a Data Encryption Standard, a payload, and a security parameter index being a parameter of a security association.

19. A network comprising:
   a communication link;
   a first electronic system coupled to the communication link, the first electronic system to secure the communication link in a pre-boot environment in order to protect integrity of data transferred over the communication link, the first electronic system includes a computer that comprises
      a processor, and
      a storage device including a non-volatile memory including a communication application and a security communication protocol, the security communication protocol, when executed, produces a packet of information including an Internet Protocol (IP) header, an initialization vector used by a Data Encryption Standard, a payload, a security parameter index being a parameter of a security association and a padding; and
   a second electronic system coupled to the communication link to transfer data to the first electronic system over the secure communication link.

* * * * *